US010682915B2

United States Patent
Hofer et al.

(10) Patent No.: US 10,682,915 B2
(45) Date of Patent: Jun. 16, 2020

(54) CHARGING AN ELECTRICAL ENERGY STORE ON AN ELECTRIC VEHICLE AT A SOCKET WITH REDUCTION OF THE CHARGING CURRENT AFTER FAILURE AND RESTORATION OF THE POWER SUPPLY

(71) Applicant: Bayerische Motoren Werke Aktiengesellschaft, Munich (DE)

(72) Inventors: Gerhard Hofer, Munich (DE); Detlef Von Reusner, Feldkirchen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 861 days.

(21) Appl. No.: 14/722,747

(22) Filed: May 27, 2015

(65) Prior Publication Data
US 2015/0251549 A1 Sep. 10, 2015

Related U.S. Application Data

(63) Continuation of application No. PCT/EP2013/074579, filed on Nov. 25, 2013.

(30) Foreign Application Priority Data

Nov. 28, 2012 (DE) .......... 10 2012 221 807

(51) Int. Cl.
*B60L 53/14* (2019.01)
*B60L 11/18* (2006.01)
(Continued)

(52) U.S. Cl.
CPC ............ *B60L 11/1809* (2013.01); *B60L 3/00* (2013.01); *B60L 53/00* (2019.02); *B60L 53/14* (2019.02);
(Continued)

(58) Field of Classification Search
CPC .................................................. B60L 11/1809
(Continued)

(56) References Cited

U.S. PATENT DOCUMENTS 5,939,855 A * 8/1999 Proctor ................. H02J 7/0073
320/104
8,064,178 B2 * 11/2011 Markyvech ........... B60L 3/0069
361/42
(Continued)

FOREIGN PATENT DOCUMENTS

| CN | 101546920 A | 9/2009 |
| CN | 101611525 A | 12/2009 |

(Continued)

OTHER PUBLICATIONS

Chinese Office Action issued in counterpart Chinese Application No. 201380069645.4 dated Jun. 1, 2016, with English translation (sixteen (16) pages).
(Continued)

Primary Examiner — Jerry D Robbins
(74) Attorney, Agent, or Firm — Crowell & Moring LLP (57) ABSTRACT

A method is provided for charging an electrical energy store on an electric vehicle at a socket providing a power supply, particularly a single-phase 230 V or 120 V domestic socket. The charging current used to charge the electrical energy store after failure and subsequent restoration of the power supply is automatically reduced over the charging current prior to failure of the power supply.

14 Claims, 5 Drawing Sheets

(51) Int. Cl.
*H02J 7/02* (2016.01)
*H02J 7/04* (2006.01)
*B60L 3/00* (2019.01)
*B60L 53/63* (2019.01)
*B60L 53/16* (2019.01)
*B60L 53/00* (2019.01)
*B60L 53/22* (2019.01)
*B60L 53/18* (2019.01)
*H02J 13/00* (2006.01)
*H02J 3/14* (2006.01)
*H02J 3/00* (2006.01)

(52) U.S. Cl.
CPC ............... *B60L 53/16* (2019.02); *B60L 53/18* (2019.02); *B60L 53/22* (2019.02); *B60L 53/63* (2019.02); *H02J 7/027* (2013.01); *H02J 7/045* (2013.01); *H02J 13/00009* (2020.01); *B60L 2240/549* (2013.01); *H02J 3/001* (2020.01); *H02J 3/14* (2013.01); *Y02E 60/721* (2013.01); *Y02T 10/7005* (2013.01); *Y02T 10/7088* (2013.01); *Y02T 90/121* (2013.01); *Y02T 90/127* (2013.01); *Y02T 90/128* (2013.01); *Y02T 90/14* (2013.01); *Y02T 90/163* (2013.01); *Y02T 90/168* (2013.01); *Y04S 10/126* (2013.01); *Y04S 30/12* (2013.01)

(58) Field of Classification Search
USPC .......................................................... 320/109
See application file for complete search history.

(56) References Cited

U.S. PATENT DOCUMENTS

| | | | |
|---|---|---|---|
| 2009/0237142 A1 | 9/2009 | Matsuda et al. | |
| 2010/0102778 A1* | 4/2010 | Otsu | H01M 10/052 320/116 |
| 2011/0175569 A1* | 7/2011 | Austin | B60L 11/1824 320/109 |
| 2011/0204850 A1* | 8/2011 | Kaino | H02J 7/0029 320/116 |
| 2012/0086396 A1 | 4/2012 | Pan et al. | |
| 2012/0139490 A1* | 6/2012 | Ishii | B60L 11/1816 320/109 |
| 2012/0265362 A1* | 10/2012 | Yasko | B60L 11/1838 700/297 |
| 2012/0274268 A1 | 11/2012 | Ishida | |
| 2013/0119947 A1 | 5/2013 | Ishida et al. | |

FOREIGN PATENT DOCUMENTS

| | | |
|---|---|---|
| CN | 102163755 A | 8/2011 |
| CN | 102447294 A | 5/2012 |
| CN | 102510816 A | 6/2012 |
| CN | 102738861 A | 10/2012 |
| CN | 102761153 A | 10/2012 |
| EP | 2 511 125 A2 | 10/2012 |
| EP | 2 518 852 A2 | 10/2012 |
| JP | 2012-39685 A | 2/2012 |
| WO | WO 2011/155206 A1 | 12/2011 |

OTHER PUBLICATIONS

German Search Report dated Oct. 16, 2013, with English translation (Ten (10) pages).
International Search Report (PCT/ISA/210) dated Sep. 4, 2014, with English translation (Seven (7) pages).

* cited by examiner

CHARGING AN ELECTRICAL ENERGY STORE ON AN ELECTRIC VEHICLE AT A SOCKET WITH REDUCTION OF THE CHARGING CURRENT AFTER FAILURE AND RESTORATION OF THE POWER SUPPLY

CROSS REFERENCE TO RELATED APPLICATIONS

This application is a continuation of PCT International Application No. PCT/EP2013/074579, filed Nov. 25, 2013, which claims priority under 35 U.S.C. § 119 from German Patent Application No. 10 2012 221 807.6, filed Nov. 28, 2015, the entire disclosures of which are herein expressly incorporated by reference.

BACKGROUND AND SUMMARY OF THE INVENTION

The invention relates to the charging of an electrical energy storage device of an electric vehicle at a power socket serving as a power supply—particularly a household power socket.

In the following, the term 'electric vehicles' means any vehicle which is driven by an electric motor, wherein the electric motor obtains electrical energy from an electrical energy storage device (for example, an electric battery or an electric capacitor) which can be charged at an electric charging source outside the vehicle—for example at a household power socket connected to a power grid. This means both purely electrically-driven electric vehicles with no internal combustion engine, as well as electric vehicles with range extenders and plug-in hybrid vehicles.

Conventional single-phase household power sockets, with 230V alternating current (for example, in Europe) or 120V alternating current (for example, in North America), by way of example, can usually only supply a low maximum charging current—for example a maximum of 16 A—in contrast to industrial power sockets, charging stations, or wall boxes. When the current load is exceeded, an overcurrent protection device is typically triggered, and interrupts the circuit.

In the IEC 61851-1:2010 and SAE-J1772 (January 2010) norms for the standardization of the charging of electric vehicles, it states that the maximum charging current which the vehicle can draw via the external charging source is communicated to the vehicle via the pulse width ratio of the pulse-width modulated pilot signal generated in the power supply device (EV supply equipment)—for example 13A at a certain pulse width ratio. When the vehicle knows the maximum charging current (that is, the available charging current), it can scale up the actual charging current to the same.

In cases where charging occurs at a power socket, the pilot signal which indicates the maximum charging current is generated in a so-called in-cable control box which is part of the charging cable fitting.

According to IEC 61851-1:2010, the current carrying capacity of the charging cable fitting can be coded by the value of a resistor in the charging cable fitting—for example 1.5 kΩ at 13 A current carrying capacity, and 220Ω at 32 A current carrying capacity. This resistor is also called a proximity resistor because it is situated between the proximity contact and the ground contact in the vehicle coupling connected to the vehicle.

It is possible to realize charging cable fittings for different household power socket types with different current carrying capacities using the mechanisms defined to date in the standards for limiting charging current.

Numerous electric vehicles can be charged in a household power socket by means of a mobile charging cable fitting, said power socket being part of an electric circuit which is protected by an overcurrent protection device (for example, a 16 Å circuit breaker), which can also be loaded by additional consumers during charging of the vehicle in addition to the electrical load of the vehicle.

In such cases, it cannot be predicted when, and whether, a consumer is added to the same electric circuit along with the vehicle. If the overcurrent protection device is tripped when a consumer is added to the electric circuit, the overcurrent protection device in the domestic installation interrupts the electric circuit such that the power supply fails and the charging is halted. In the opposite scenario, a load resulting from one consumer or multiple consumers may already be connected to the electric circuit before the load of the electric vehicle is added to the electric circuit, such that the overcurrent protection device is tripped when the electric vehicle is added to the electric circuit for the purpose of charging the motor vehicle, and the overcurrent protection device then immediately cuts the electric circuit.

If the interruption implemented at the overcurrent protection device is manually overridden—for example by the user resetting a circuit breaker, the vehicle will automatically attempt to charge the vehicle again using the same charging current as before the failure of the power supply, and the overcurrent protection device will again interrupt the electric circuit. This repeated tripping of the overcurrent protection device in the domestic installation can lead to damage to electric installations over time. In addition, this means that the user of the electric vehicle cannot charge his vehicle as long as he does not carry out a modification of the loads on the electric circuit—for example by removing a consumer on the electric circuit.

The problem addressed by the invention is that of eliminating the disadvantages described above.

The problem is addressed by the features according to the exemplary embodiments of the invention.

A first aspect of the invention relates to a method for charging an electrical energy storage device of an electric vehicle at a power socket serving as the power supply. The method is preferably used for charging at a household power socket—by way of example at a single-phase 230V or 120V household power socket—because in household power sockets, the overcurrent protection device is triggered even at low charging currents—for example above approx. 14 A continuous current (a breaker with a nominal value of 16 A can trip at approx. 10% below its normal value if there is a continuous current). However, in principle, the invention could also be used for charging at industrial power sockets with higher current protection.

By way of example, the energy storage device of the vehicle has already been charging for a certain period of time, and an overcurrent protection device is triggered by the addition of a further consumer, leading to a failure of the power supply. As an alternative, by way of example, an overcurrent protection device is triggered immediately after charging starts, if, for example, the electric circuit was already loaded by one or multiple consumers.

According to the method, following the failure of the power supply, and subsequent restoration of the power supply, a charging current is used to charge the electrical energy storage device, which is automatically reduced—for example by 10% or more—compared to the charging current prior to the failure of the power supply.

That is, an automatic reduction in charging current following a sudden failure of the power supply is provided according to the invention. If the charging procedure is re-started following the restoration of the power supply, the vehicle charges with a reduced charging current.

Using the method according to the invention, it is possible for a charging process to be continued following the triggering and subsequent reset of the overcurrent protection device in the domestic installation, without the overcurrent protection device being triggered repeatedly. The charging process in this case can be automatically continued at the vehicle end following restoration of the power supply, without the user needing to act. The invention prevents damage to the domestic electrical installation resulting from repeated triggering of the overcurrent protection device in the domestic electric installation. In addition, the invention enables a charging at an electric circuit which is loaded with other electrical consumers, or at an electric circuit which has weak overcurrent protection, without the user needing to carry out a modification of the loads on the electric circuit— for example by removing a consumer from the electric circuit. A user who does not wish to get involved with the current capacity of the domestic installation, or other charging current settings, is freed from these tasks because the charging current is adapted automatically.

Moreover, the method according to the invention reduces the heightened wear of household power sockets and of the plug of the charging cable fitting, the same resulting when, during the charging process, the plug of the charging cable fitting is first pulled out of the power socket, rather than the vehicle coupling of the charging cable fitting being pulled out of the power connector of the vehicle. The removal of the plug from the power socket can be interpreted as a failure of the power supply, such that a reduced charging current is used for a later charging process. In order to prevent a reduction in the charging current, the user first separates the vehicle coupling of the charging cable fitting. This is generally only possible if a release device is actuated which simultaneously ends the charging—such that the power supply contacts of the vehicle coupling of the charging cable fitting carry substantially zero current when released.

The charging current is preferably limited at its upper end by an active charging current limit prior to failure of the power supply and following restoration of the power supply. In the method according to the invention, the active charging current limit in this case is smaller following restoration of the power supply than the active charging current limit prior to the failure of the power supply—particularly by at least 10%. The active charging current limit is, by way of example, reduced from approximately 13 A to approximately 10 A.

The mechanism for the automatic charging current reduction can be implemented, by way of example, in the vehicle, or alternatively in the in-cable control device of the charging cable fitting.

In one embodiment of the method according to the invention, the mechanism for reducing the charging current is implemented in the vehicle—that is, the reduction of the charging current is performed on the vehicle end. For this purpose, there is a variable charging current limit in the vehicle, prior to the failure of the power supply, for the purpose of limiting the maximum charging current for the charging of the household power socket. The variable charging current limit can be modified, by way of example, by the user via an operating element in the vehicle, and corresponds by way of example to a defined fraction of the maximum charging current encoded by the pilot signal—for example a variable charging current limit with multiple steps, for example three steps of 100%, 75%, and 50% of the maximum charging current encoded by the pilot signal. In the event that a failure occurs in the power supply prior to the end of charging, the vehicle automatically reduces the charging current limit; by way of example, in the case of a charging current limit which can be adjusted by multiple steps, the charging current limit is reduced by one step (for example from 100% of the maximum charging current to 75% of the maximum charging current).

Once the power supply has been restored, the charging process is then carried out at a reduced charging current, corresponding to the reduced charging current limit (if the charging process has not been ended).

The reduced charging current limit can be saved in the vehicle such that it can preferably be utilized to limit the charging current for another charging process following use of the vehicle (for example, on the following day).

The charging current limit is reduced in this embodiment following failure of the power supply. The vehicle can recognize the failure of the power supply, by way of example, for the purpose of triggering the reduction of the charging current limit, and can reduce the charging current limit once it has recognized the failure. The failure of the power socket can be determined, by way of example, by the presence of two conditions. First, there is a corresponding signal in a proximity circuit which includes the proximity contact, which indicates an existing connection of the vehicle coupling of the charging cable fitting to the vehicle (by way of example, a certain current is flowing over the proximity resistor on the proximity contact). Second, the vehicle no longer detects a pilot signal.

The reduction of the charging current limit can be repeated—even multiple times. As such, the charging current limit is reduced by a first value, for example, following a first failure of the power supply; after the charging process is resumed and a second failure then occurs in the power supply, the charging current limit is again reduced before the charging process is ended. In addition, a charging current limit which is reduced due to a failure of the power supply is also preferably used upon a new charging process (for example the following day). A failure of the power supply upon the new charging process would then lead to a further reduction in the already-reduced charging current limit.

The vehicle preferably uses a charging current limit present in the vehicle for the purpose of limiting the charging current when the vehicle recognizes that the vehicle is being charged at a household power socket and not at a charging station or a so-called wall box. For this purpose, a test is made, for example of whether the available charging current is less than—or is equal to or less than—a threshold value, for example less than or equal to a threshold value of approximately 15 A (the exemplary threshold value of 15 A is reasonable considering that the charging cable fittings which can be used for household power sockets are generally coded with 12 A as the available charging current). For this purpose, the maximum charging current encoded by the pilot signal, and optionally the current carrying capacity defined by the proximity resistor, can be analyzed. By way of example, the vehicle observes the charging current limit if the maximum charging current defined by the pilot signal, and the current carrying capacity encoded by the proximity resistor, are less than or equal to a threshold value of approximately 15 A, because this indicates charging at a household power socket.

Preferably, a charging current limit which was already reduced is not used in a renewed charging process for the purpose of limiting the charging current, under the condition that the vehicle is not being charged at a household power socket (but rather at a charging station or a so-called wall box). For this purpose, a check is made, by way of example, of whether the available charging current of the power socket is greater than—or is greater than or equal to—a threshold value, wherein this is particularly recognized using the received pilot signal. By way of example, a charging current limit which was already reduced in a previous charging process is ignored in a renewed charging process if the maximum charging current defined by the pilot signal, and optionally also the current carrying capacity encoded by the proximity resistor, are greater than a threshold value of approximately 15 A, by way of example. In this case, the charging current is limited by an active charging current limit which corresponds to the minimum (lesser) of the maximum charging current defined by the pilot signal and the current carrying capacity encoded by the proximity resistor.

In a further embodiment of the method according to the invention, the mechanism which reduces the charging current following a failure of the power supply is implemented in the in-cable control device of the charging cable fitting—that is, the reduction of the charging current is carried out by an in-cable control device of the charging cable fitting.

For this purpose, a reduced charging current limit used to limit the charging current is saved in the in-cable control device prior to the failure of the power supply, wherein this charging current limit is reduced compared to the active charging current limit prior to the failure of the power supply of the motor vehicle. That is, a charging current limit is saved which is less than the charging current limit which was used, up to the failure of the power supply, for the purpose of limiting the maximum charging current. After the power supply is restored, the saved, reduced charging current limit is then used as the active charging current limit for the purpose of limiting the charging current.

The background for the early saving of a reduced charging current limit (for example even before the charging of the vehicle begins) is that the in-cable control device itself is no longer supplied with current upon a failure in the power supply (because it typically does not have its own power supply), and therefore it can no longer react to the failure by reducing the charging current limit.

The charging current limit is preferably saved in the control device non-volatilely by means of a non-volatile memory—for example by means of a flash memory device or an EEPROM (electrically erasable programmable read-only memory). The saved charging current limit is saved permanently as a result of the non-volatile saving of the charging current limit—that is, even if the plug of the charging cable, with the in-cable control device, is separated from the household power socket, and therefore is no longer supplied with current.

A reduced charging current limit is preferably saved after the vehicle signals that it is ready to be charged, and before the charging of the vehicle begins. Pursuant to IEC 61851-1:2010, a switch in the charging interface of the vehicle is closed to signal readiness for charging, such that the high-level of the pilot signal drops from +9V to +6V. This level drop can be recognized by the control device, and then a reduced charging current limit can be saved which is then used following a power failure and subsequent restoration of the power supply for the purpose of limiting the charging current.

The charging process is carried out by way of an active current limit (for example 13A) which is greater than the saved, reduced current limit (for example 10A). If the charging process ends without a failure in grid power, the active current limit is taken as the charging current limit and saved in the control device. In the process, the reduced charging current limit which is preferably saved prior to the start of the charging process is overwritten. If, however, during the charging a grid power failure occurs, the charging process is performed at reduced charging current following restoration of the power supply, because after the control device is switched on, the saved, reduced charging current limit is taken as the active current limit.

It is advantageous if the charging current limit can be set by the user via an operating element of the charging cable fitting, and is preserved when the charging cable fitting is removed from the household power socket. The set charging current limit is taken as the active charging current limit for the purpose of limiting the charging current during the charging process.

A second aspect of the invention relates to an electric vehicle having an electrical energy storage device which can be charged at a household power socket which serves as the power supply, via a charging device integrated in the vehicle. The vehicle has a variable charging current limit for the purpose of limiting the maximum charging current; the charging current limit can preferably be modified by the user. The vehicle is configured to automatically reduce the charging current limit upon a failure of the power supply.

The embodiments above relating to the method according to the invention, according to the first aspect of the invention, apply in an analogous manner to the electric vehicle as well, according to the second aspect of the invention. Advantageous embodiments of the electric vehicle which are not explicitly described correspond to the advantageous embodiments of the method according to the invention described above.

A third aspect of the invention relates to a control device for a charging cable fitting. The control device is configured to save a reduced charging current limit used for the purpose of limiting the charging current before a failure of the power supply, particularly in a non-volatile manner. The reduced charging current limit is lower than an active charging current limit used during charging for the purpose of limiting the charging current prior to the failure of the power supply, such that the saved, reduced charging current limit for the purpose of limiting the charging current is used for the charging process following restoration of the power supply. For this purpose, the saved current limit is preferably taken as the active current limit, and is indicated to the vehicle by the control device, via the pilot signal.

The embodiments above relating to the method according to the invention, according to the first aspect of the invention, also apply in an analogous manner to the control device, according to the third aspect of the invention. Advantageous embodiments of the control device which are not explicitly described at this point correspond to the advantageous embodiments of the method according to the invention described above.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
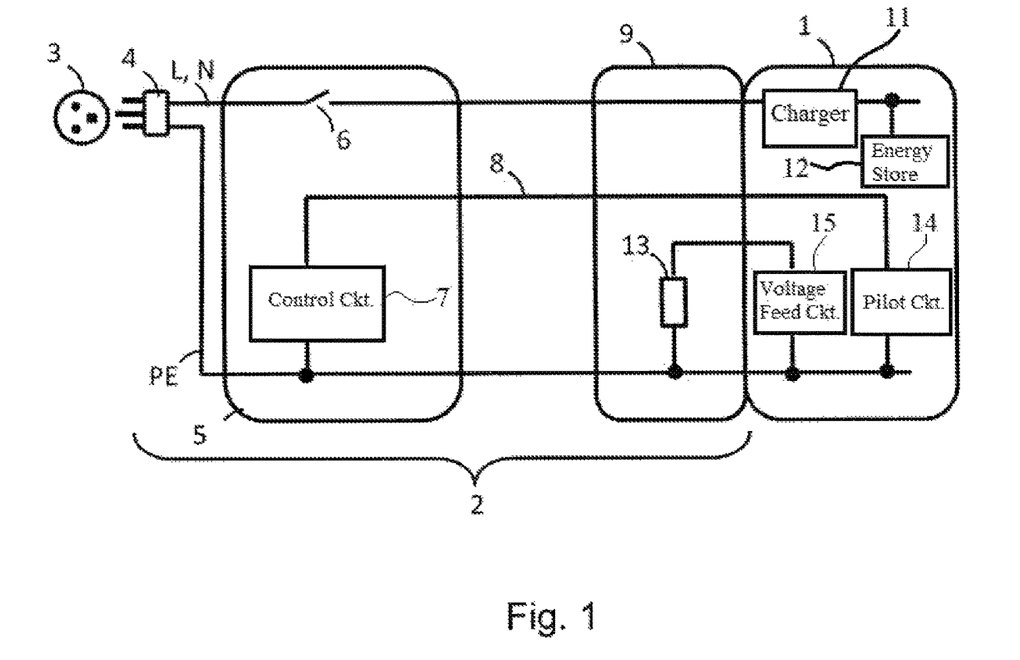
FIG. 1 is a schematic diagram of a charging cable fitting connected to the electric vehicle for the purpose of charging the electric vehicle at a household power socket.

FIG. 1 shows a schematic illustration of a charging cable fitting 2, connected to an electric vehicle 1, for the purpose of charging the electric vehicle 1 at a single-phase household power socket 3, with 230V or 120V alternating current, for example, based on the IEC 61851-1:2010 standard. The household power socket 3 is protected by an overcurrent protection device (for example, a 16 Å circuit breaker—not illustrated) and is connected to an AC power grid. The charging cable fitting 2 includes a plug 4 which is connected to the power socket 3 for charging. The plug 4 provides a line conductor (phase conductor) L, a neutral conductor N, and a protective ground conductor PE. The charging cable fitting 2 also includes an in-cable control device 5. The control device 5 includes a switch 6 (typically a contactor) to switch on or off the grid power supply for the purpose of charging the vehicle. In addition, a control circuit 7 is included which generates a pulse-width modulated (PWM) pilot signal which is transmitted to the vehicle via a pilot line 8. The charging cable fitting 2 also has a vehicle coupling 9 which can be connected to a matching charging connector of the electric vehicle 1. The vehicle coupling 9 is typically a plug. The vehicle coupling 9 includes a proximity resistor 13, the value of which indicates the current carrying capacity of the charging cable fitting 2.

For charging, the electric vehicle 1 has a charging device 11 which converts the alternating current into an appropriate direct current to charge an electrical energy storage device 12 of the vehicle. In addition, the electric vehicle 1 includes a pilot circuit 14 for the purpose of receiving the pilot signal via the pilot line 8. Moreover, the electric vehicle 1 includes a circuit 15 by which a voltage is fed to the proximity resistor 13, so that the vehicle 1 can determine the current carrying capacity of the charging cable fitting 2 utilizing the resulting current, by way of example.

According to the invention, there is an automatic reduction in charging current following a sudden failure of the grid power. If a charging process is continued following a power supply failure, the vehicle 1 charges at reduced charging current. Two embodiments which implement this method are discussed below. In the first embodiment discussed with reference to FIGS. 2 and 3, the reduction of the charging current is performed at the vehicle end 1. In the second embodiment discussed with reference to FIGS. 4 and 5, the reduction in the charging current is performed by the in-cable control device 5.

In the first embodiment which implements the method in the vehicle 1, there is a variable, pre-set charging current limit in the vehicle for charging at a household power socket 3, and this is saved in the vehicle. The variable charging current limit can be modified by the user, for example, via an operating element in the vehicle 1, and corresponds to a defined fraction of the maximum charging current encoded by the pilot signal, by way of example. By way of example, there are three steps, at 100%, 75%, and 50% of the maximum charging current encoded by the pilot signal, wherein the preset default value of the charging current limit when the vehicle 1 is delivered is 75%, by way of example. If the maximum charging current encoded by the pilot signal is 13 A, for example, this [default value] corresponds to a charging current limit of 9.75 A. The preset charging current limit of 9.75 A prior to charging is illustrated in FIG. 2 at top in the left column.

Figure 2:
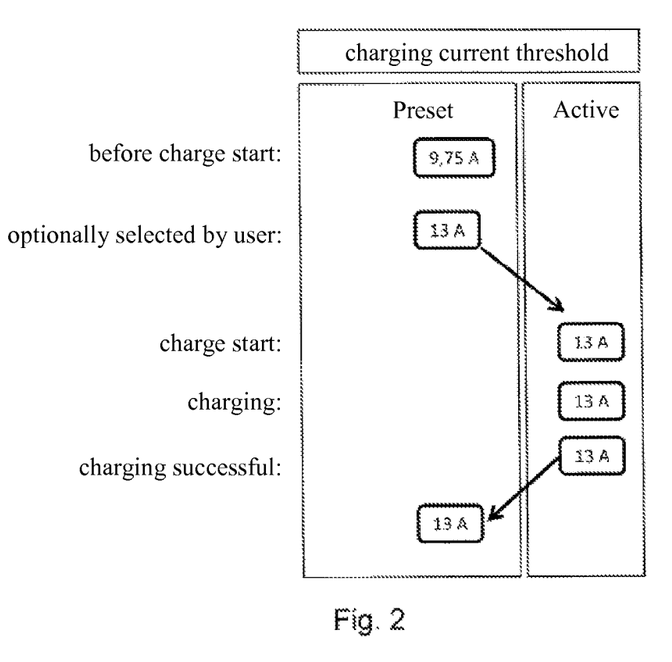
FIG. 2 is a diagram of a first embodiment of the method according to the invention, wherein the reduction of the charging current is performed at the vehicle end.

This preset charging current limit can be modified by the user if desired—for example changed to 100% of the maximum charging current encoded by the pilot signal, which in this case is 13 A (see FIG. 2). The vehicle uses the current value (13 Å in this case) of the preset charging current limit as the active charging current limit during the charging process as long as the minimum of the current limit encoded by the pilot signal and the current carrying capacity indicated by the proximity resistor is less than or equal to a threshold value—for example 15A. In such a case, the vehicle 1 assumes charging is taking place at a household power socket. In the right column in FIG. 2, the charging current limit of 13 A, pre-set by the user, is taken as the active charging current limit because the preset charging current limit is smaller than the threshold value of, by way of example, 15 Å. During charging, the active charging current limit of 13 A, by way of example, is then used for the purpose of limiting the charging current. If the charging using the active charging current limit proceeds to completion successfully without a failure in the power supply, the active charging current limit of, by way of example, 13 A is taken as the preset charging current limit. For this purpose, a value of 100% is saved for the preset charging current limit in the vehicle, by way of example.

Figure 3:
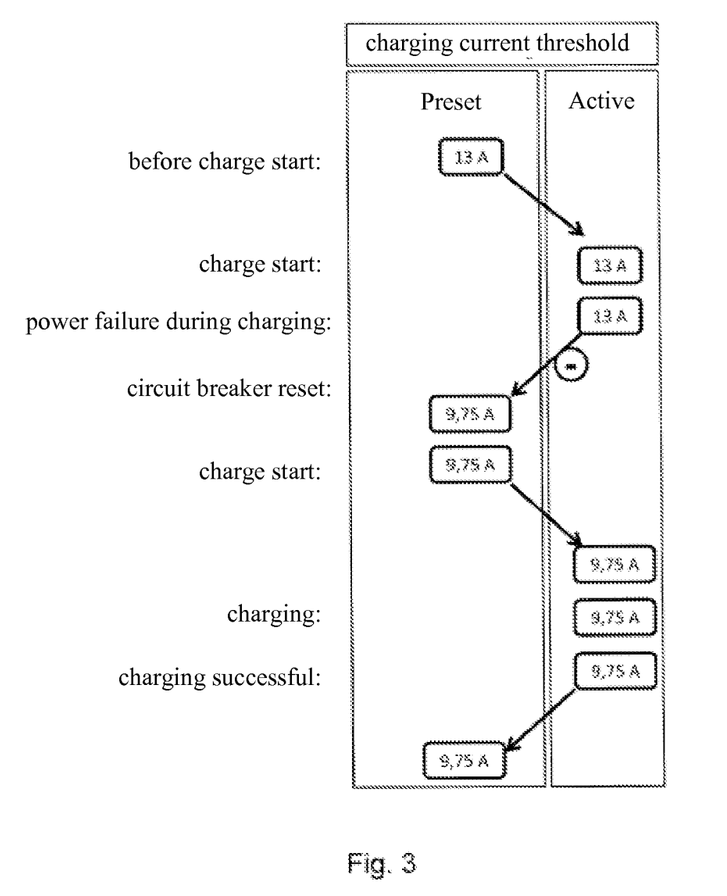
FIG. 3 is a diagram of a first embodiment of the method according to the invention, wherein the reduction of the charging current is performed at the vehicle end.

FIG. 3 shows the situation of a renewed charging process in the event that a failure occurs in the power supply prior to the end of charging. A preset charging current limit of, by way of example, 13 A (100%) is used as the active charging current limit to charge the vehicle. Subsequently, a power failure occurs during the charge with the active charging current limit of 13 A—by way of example because the overcurrent protection device of the power socket 3 cuts the voltage to the power socket 3.

If a power supply failure occurs during charging, prior to the end of charging, the vehicle reduces the preset current limit immediately after recognition of the power failure, by dropping it down one step, for example—that is, from 100% (13 A) to 75% (9.75 A). This reduction is illustrated in FIG. 3 by the circled minus sign. The power failure can be recognized, by way of example, by a current flowing over the proximity resistor, and (at the same time) the vehicle no longer receiving a pilot signal. After the circuit breaker is reset and the power supply is restored to the power socket, there is then a preset charging current limit of 75% (9.75 A) in this example, which is used as the active charging current limit upon the start of charging for the purpose of limiting the charging current. After the overcurrent protection device is reset, the vehicle recognizes that the power supply has been re-established (for example, as a result of current flowing over the proximity resistor and the vehicle receiving a pilot signal). If the power supply has been detected and the charging process is not yet ended (that is, the charging goal has not yet been reached), the charging process is automatically continued at reduced charging current, corresponding to the reduced charging current limit, without the user acting. For this purpose, the reduced, preset charging current limit is taken at the start of charging as the active charging current limit for the purpose of limiting the charging current in the subsequent charging process. If the charging proceeds to completion successfully using the lower, active charging current limit (9.75 Å in this case), the lower, active charging current limit of 9.75 A, for example, is taken as the preset charging current limit. For this purpose, a reduced value of 75%, for example, is saved for the preset charging current limit in the vehicle, by way of example.

This mechanism of reducing the charging current limit can be repeated multiple times. As such, the charging current limit is reduced a first time following a first failure of the power supply; following a subsequent, second failure of the power supply, the charging current limit is again reduced prior to the end of the charging process. In addition, a charging current limit which is reduced as a result of a failure of the supply is preferably also used in a new charging process (for example the following day). A failure in the power supply during the new charging process would then lead to a further reduction in the charging current limit which is already reduced.

At the start of charging, and upon each modification of the pulse width ratio in the pilot signal, the maximum current value is preferably determined again each time from the preset charging current limit, and then can be used as the current value for the active charging current limit.

If the minimum of the charging current limit encoded by the pilot signal and the current carrying capacity encoded by the proximity resistor exceeds the threshold value of 15 A, in this case, the charging current limit can be ignored and the vehicle then utilizes the minimum of the charging current limit encoded by the pilot signal and the current carrying capacity encoded by the proximity resistor as the active charging current limit. As a result, the mechanism is only used for charging via a charging cable fitting at a household power socket (the charging cable fittings for household power sockets are typically only coded for up to 12 A), and not for charging stations and wall boxes which allow 16 A and more.

Figure 4:
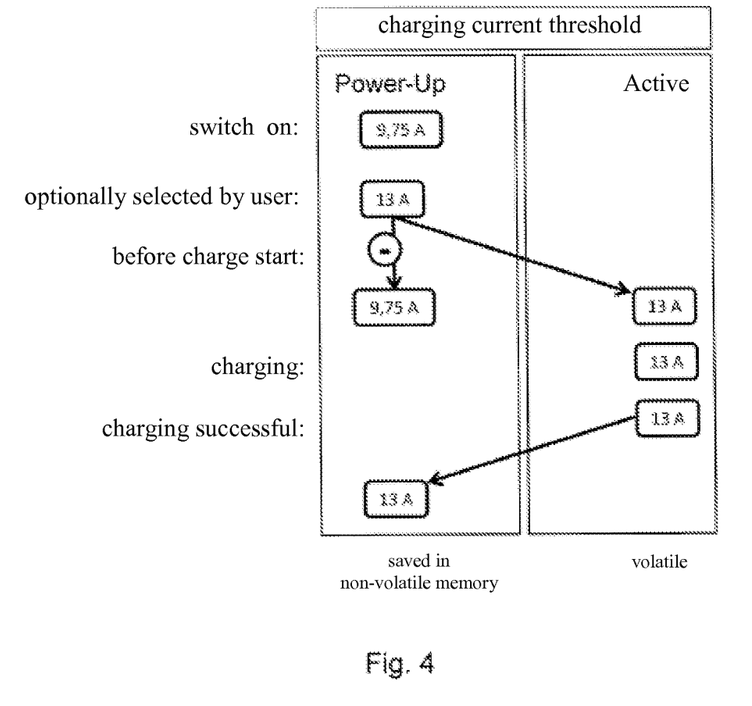
FIG. 4 is a diagram of a second embodiment of the method according to the invention, wherein the reduction of the charging current is performed by the in-cable control device.

A second embodiment of the method according to the invention is described below with reference to FIG. 4 and FIG. 5, wherein the reduction in the charging current is performed by the in-cable control device 5.

In this embodiment, the charging cable fitting 2, particularly the in-cable control device 5, includes an operating element via which the user can set a desired charging current limit. By way of example, there are three different settings for the desired charging current limit, for example at 100%, 75%, and 50% of the maximum charging current encoded by the pilot signal (13 A in this case, by way of example). A preset power-up charging current limit is saved in the in-cable control device 5, which is available after the control device 5 is switched on (for example, when the in-cable control device 5 is supplied with voltage, when the plug 4 is inserted into the power socket 3). The power-up charging current limit is saved in the in-cable control device 5 in non-volatile memory—for example in a flash memory or in an EEPROM. The power-up charging current limit is illustrated in the left column in FIG. 4.

After the in-cable control device 5 is switched on, the saved power-up charging current limit is set as the active current limit at the start of charging, unless the user modifies the charging current. The user can set the current limit at the operating element (for example 13A, 100% in FIG. 4) after the in-cable control device 5 is switched on (for example by the charging cable fitting 2 being plugged into the household power socket 3) and prior to the start of the charging process (that is, before the charging cable fitting 2 is plugged into the vehicle 1). The set current limit is saved in non-volatile memory as the power-up charging current limit, and is also taken as the active charging current limit. As soon as the vehicle 1 signals readiness for charging (by way of example when the high-level of the pilot signal drops from 9V to 6V), a reduced current limit is saved in non-volatile memory as the power-up current limit (in FIG. 4, a power-up current limit of 9.75 A/75% rather than the previously-set 13 A/100%). The saved power-up charging current limit is reduced compared to the previous power-up charging current limit (13 A/100% in this case), by way of example by one step, wherein the previous power-up charging current limit corresponds to the active charging current limit (13 A/100% in this case) used at the start of charging.

Next, the in-cable control device 5 connects the grid voltage through to the vehicle 1 by closing the contactor 4. The charging process is carried out with the active charging current limit (13 A in FIG. 4). If the charging process is ended without a power failure occurring, the active charging current limit is taken as the power-up charging current limit, and saved in non-volatile memory.

Figure 5:
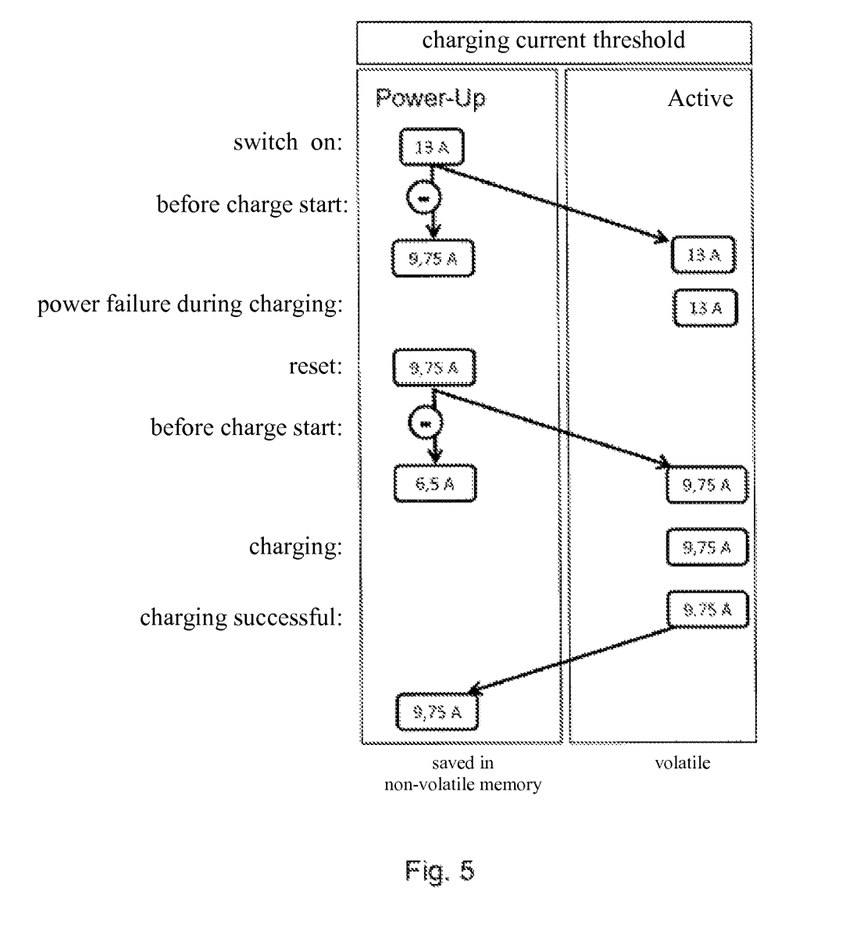
FIG. 5 is a diagram of a second embodiment of the method according to the invention, wherein the reduction of the charging current is performed by the in-cable control device.

FIG. 5 shows the case where a power failure occurs during the charging process. The power-up charging current limit is—as described above—reduced prior to the start of charging (for example by one step), and the reduced value is saved in a non-volatile memory. If a power failure then occurs with the active charging current limit (13 A in this case), when the in-cable control device 5 is switched on again (after the user resets the overcurrent protection device and the control device 5 is supplied with voltage again), the saved, reduced value is in effect for the power-up charging current limit. Prior to the start of charging, a further-reduced current limit (6.5 A/50% in this case) is saved in non-volatile memory as the power-up current limit, and is one step lower compared to the reduced power-up current limit saved before the power failure. After the breaker is reset and the reduced charging current limits are saved, the charging process starts again automatically, and this charging process is carried out with reduced charging current because the power-up charging current limit is taken as the active current limit after the control device 5 is switched on again.

If there are repeated power supply failures, the power-up charging current limit can be reduced one step per each power supply failure.

The mechanism described above in conjunction with FIG. 4 and FIG. 5 functions such that, when a charging process occurs without a power supply failure, the power up charging current limit used is then also used for the following charging processes. If, however, a power supply failure occurs, the power-up charging current limit is reduced such that there is no need for the user to act when further charging processes are carried out at the same power socket.

The two embodiments described above can optionally be expanded by a configuration wherein, as a further trigger for the charging current reduction, the recognition of excess temperature in the plug 4 for the household power socket 3 is used if the charging cable fitting 2 is equipped with a corresponding temperature sensor. In this case, after recognition of excess temperature—that is, when a threshold temperature is reached or exceeded, a reduced charging current limit is saved for following charging processes. This approach prevents damage to the domestic electric installation resulting from repeated charging at charging currents which lead to a significant increase in temperature.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for charging an electrical energy storage device of an electric vehicle at a power socket which serves as a power supply, the method comprising the act of:
following a failure of the power supply and a subsequent restoration of the power supply, using a charging current, which is automatically reduced compared to the charging current before the failure of the power supply, to charge the electrical energy storage device.

2. The method according to claim 1, wherein, prior to the failure of the power supply and following the restoration of the power supply, a maximum charging current is limited by an active charging current limit in both cases, and the active charging current limit is lower following the restoration of the power supply than the active charging current limit prior to the failure of the power supply.

3. The method according to claim 2, wherein the active charging current is lower by at least 10%.

4. The method according to claim 1, wherein the reduction of the charging current is performed at a vehicle end, by:
there being a variable charging current limit in the vehicle for the purpose of limiting the maximum charging current, prior to the failure of the power supply, and
the charging current limit being automatically reduced at the vehicle end following the failure of the power supply.

5. The method according to claim 4, wherein the reduced charging current limit is not used for a renewed charging process for the purpose of limiting the charging current, on the condition that the available charging current of the power supply is greater than or equal to a certain threshold value, wherein said condition is recognized at the vehicle end utilizing a received pilot signal.

6. The method according to claim 1, wherein the reduction in the charging current is performed on a side of an in-cable control device of the charging cable fitting, by:
a reduced charging current limit being saved in the power supply prior to the failure of the power supply, and
the saved, reduced charging current limit being used following restoration of the power supply for the purpose of limiting the charging current.

7. The method according to claim 6, wherein the reduced charging current limit is saved after the vehicle signals readiness for charging, and before the charging of the vehicle begins.

8. The method according to claim 6, wherein the active charging current limit is taken as the charging current limit for the charging of the vehicle and is saved in the control device if the charging ends without a failure in the power supply.

9. The method according to claim 7, wherein the active charging current limit is taken as the charging current limit for the charging of the vehicle and is saved in the control device if the charging ends without a failure in the power supply.

10. The method according to claim 6, wherein a charging current limit is settable via an operating element of the charging cable fitting, and persists when the charging cable fitting is removed from the power socket.

11. The method according to claim 1, wherein the power socket is a single-phase 230V or 120V household power socket.

12. An electric vehicle, comprising:
an electrical energy storage device which is chargeable at a power socket which serves as a power supply, wherein
the vehicle has a variable charging current limit for the purpose of limiting a maximum charging current, and
the vehicle is configured to automatically reduce the charging current limit following failure of the power supply.

13. A control device for a charging cable fitting for the purpose of charging an electric vehicle at a power socket, wherein the control device is configured to save a reduced charging current limit, for the purpose of limiting the charging current, prior to a failure in the power supply, such that the saved, reduced charging current limit is used for the purpose of limiting the charging current for the charging process following restoration of the power supply.

14. A method for charging an electric energy storage device of an electric vehicle at a power socket providing a power supply, the method comprising the acts of:
providing a charging current prior to a failure of the power supply; and
automatically reducing the charging current used to charge the electric energy storage device in a subsequent restoration of the power supply after the failure of the power supply.

* * * * *